United States Patent [19]

Stark

[11] Patent Number: 5,027,590
[45] Date of Patent: Jul. 2, 1991

[54] LAWN MOWER ATTACHMENT

[76] Inventor: Max L. Stark, 16765 252 Ave., Umatilla, Fla. 32784

[21] Appl. No.: 484,910

[22] Filed: Feb. 26, 1990

[51] Int. Cl.$^5$ .................... A01D 34/82; A01D 75/10
[52] U.S. Cl. ....................... 56/12.1; 56/17.5; 56/320.1; 239/DIG. 6; 285/161; 285/345
[58] Field of Search ................. 56/12.1, 320.1, 320.2, 56/16.8, 17.5; 285/161, 206, 208, 205, 304, 345, 346; 239/104, 289, 589, 600, 282, 283, 268, 200, DIG. 6

[56] References Cited

U.S. PATENT DOCUMENTS

| | | | |
|---|---|---|---|
| D. 275,314 | 8/1984 | Cornell | 285/161 X |
| 1,182,898 | 5/1916 | Eilertsen | 239/282 X |
| 2,504,416 | 4/1950 | Hileman | 56/12.2 |
| 2,835,305 | 5/1958 | Boyer | 285/206 X |
| 2,936,563 | 5/1960 | Blume | 56/12.1 |
| 2,984,061 | 5/1961 | Stabnau | 56/12.1 X |
| 2,992,524 | 7/1961 | Stabnau | 56/12.1 X |
| 3,040,990 | 6/1962 | Gotti | 56/12.1 X |
| 3,214,893 | 11/1965 | Griffin | 56/12.1 X |
| 3,490,212 | 1/1970 | Hengesbach | 56/16.8 |
| 3,535,862 | 10/1970 | Wittwer | 239/DIG. 6 X |
| 3,667,785 | 6/1972 | Kapeker | 285/345 X |
| 4,362,187 | 12/1982 | Harris et al. | 285/345 X |
| 4,437,611 | 3/1984 | Gilroy | 239/600 X |
| 4,613,169 | 9/1986 | Engehart | 285/161 |
| 4,676,533 | 6/1987 | Gerondale | 285/158 |

FOREIGN PATENT DOCUMENTS 2023249 12/1959 United Kingdom ............... 285/304

*Primary Examiner*—Hoang C. Dang
*Attorney, Agent, or Firm*—William F. Hamrock

[57] ABSTRACT

An attachment for cleaning the underside of rotary lawn mowers which is a horizontal tubular device having a mower connecting member and quick connect receiver extension. The attachment is connected through the side casing of the mower and is releasably attachable to a quick disconnect fitting which can be connected to a conventional garden hose.

2 Claims, 3 Drawing Sheets

LAWN MOWER ATTACHMENT

BACKGROUND OF THE INVENTION

1. Field of the Invention

The invention relates to an attachment which is mounted on a rotary lawn mower for cleaning the underside of the mower and, more particularly to a quick disconnect attachment which is combatable with garden hose connections.

2. Description of the Prior Art

There is a problem in the prior art in obtaining a suitable means for cleaning the underside of lawn mowers.

In reviewing the prior art patents in this area, it is seen that U.S. Pat. No. 2,936,563 discloses a rotary lawn mower having a water conduit connected through the mower housing. The conduit portion external to the housing is connectable to a hose and the tubular pipe section conduit internal to the housing extends within the housing some distance above the blade. The problems with this attachment are that the tubular pipe conduit internal of the housing extends internally such a distance that it tends to catch grass a debris and itself has to be cleaned, and also is in such close proximity to the blade that there is always the possibility of being hit by the rotating blade which could result in extensive damage. A further problem is that the conduit pipe portion external to the housing requires a complicated system of attaching the hose which requires time and effort.

U.S. Pat. Nos. 3,214,893 and 3,040,990 are also directed to washer attachments for rotary lawn mowers but also have problems associated with complicated attachment elements.

A point of particular interest in this situation is in general use today are quick disconnect attachments for water hoses and other water supply equipment. These devices are popular because of their simplicity of connection and disconnection and their efficiency of use. However, the devices are not compatible with present day lawn mower cleaning attachments because of the lack of a quick connect receiver to connect the same to lawn mowers. It would be a significant improvement in the field if such quick disconnect attachments could be used with a lawn mower cleaning device.

Thus a need exists for an attachment for rotary lawn mowers which efficiently cleans the interior surface of the mower, is inexpensive, is easy to install, is easily attachable to, and easily disconnectable from, hose quick disconnect attachments, does not create an internal cleaning problem because of grass or debris being caught therein, is durable and rust resistant, and is not located in such close proximity so as to come in contact with the blade of the mower.

SUMMARY OF THE INVENTION

Thus the primary object of the present invention is to provide an attachment for rotary lawnmowers with standard quick disconnect hose attachments to efficiently clean the interior of the mower.

Another object of the invention is to provide a cleaning attachment which does not collect grass or debris and is not in close proximity to the blade of the mower.

A further object of the invention is to provide a cleaning attachment which is easy to attach or to remove or replace.

Another further object of the invention is to provide a cleaning attachment which is inexpensive, durable, and will not rust.

Other objects and advantages of the present invention are apparent to one skilled in the art from the study of this disclosure, the drawings in the appended claims.

These and other objects are accomplished by the parts, construction and arrangements comprising the present invention, the nature of which is set forth in the following description and illustrated in the accompanying drawings and which are particularly and distinctly pointed out and set forth in the appended claims forming a part thereof.

The above specified objects of the present invention can be achieved by a plastic attachment for a lawn mower having a rotating blade comprising a plastic tube with an enlarged head formation having smooth contoured surfaces integral with an exterior threaded portion, and an exterior nut therefor, and having a detent fitting and O-ring seal end portion whereby the enlarged head formation engages the inner surface within the mower casing and the attachment is secured to the mower by tightening the exterior nut thereby permiting easy and quick connection and disconnection to quick disconnect devices for water hoses and the like to accomplish cleaning the interior of the mower absent of grass or debris collecting at the internal connection within the casing because of the flat, smooth contoured surfaces thereof which inhibit adherence thereto and also prevents contact with the rotating blade.

DESCRIPTION OF THE PREFERRED EMBODIMENTS

Figure 1:
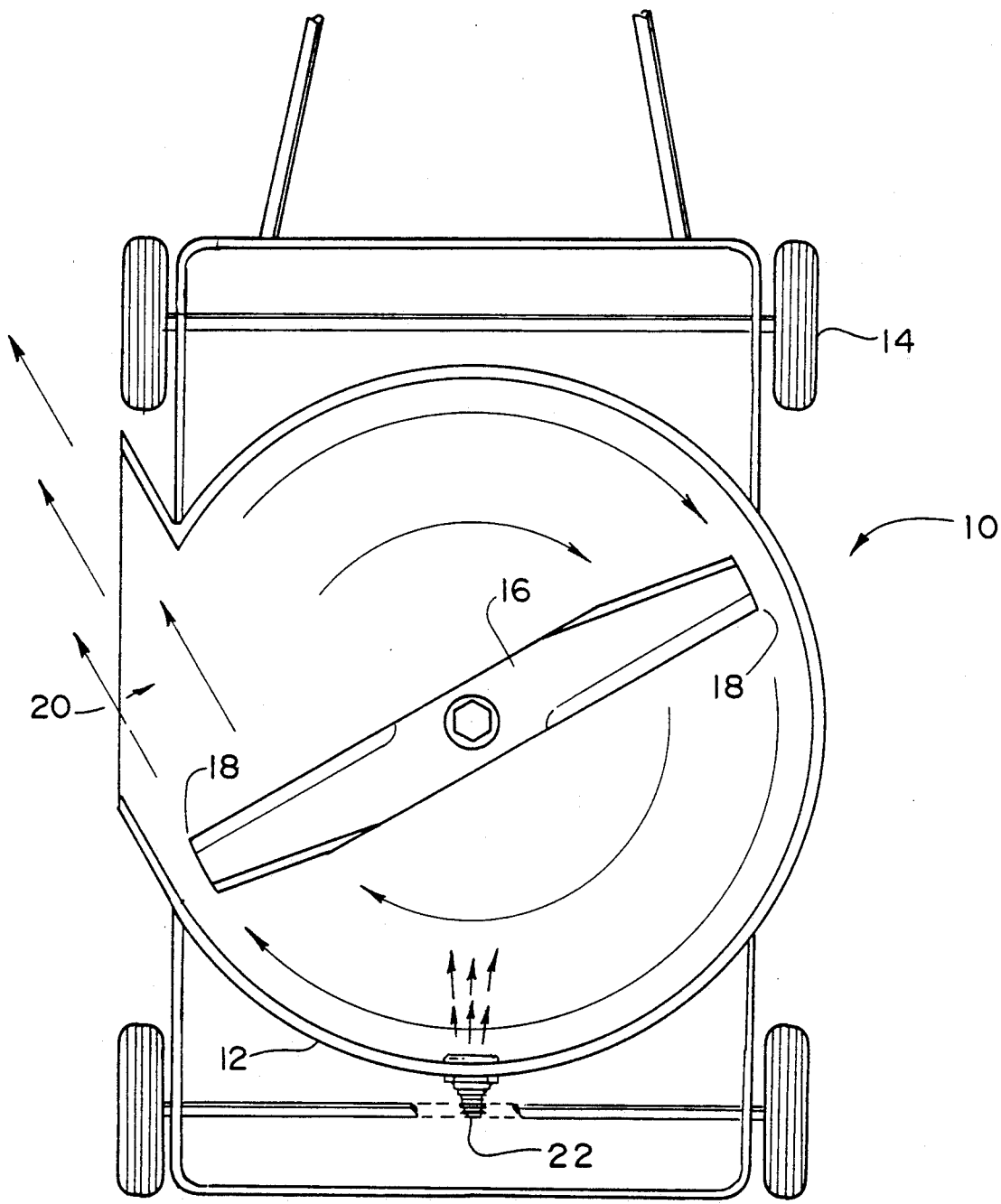
FIG. 1 is a perspective view of a lawn mower with the present attachment.

A lawn mower 10 is shown in FIG. 1 having a casing 12 mounted on wheels 14 and including a blade 16. During operation the blade rotates at high velocity cutting the grass and debris which are to be discarded in the direction of the discharge section 20 as shown by the arrows. However, the problem is that cut grass and debris collect within the interior of the casing causing a buildup of cut materials adhering to the casing. This condition is more pronounced under wet conditions which enhances the build-up of the cut materials within the casing.

The result is that the efficiency of operation of the lawn mower is considerably reduced causing substantial problems. The built-up materials must be detached and the mower interiors cleaned at frequent intervals.

It is shown in FIG. 1 that the ends 18 of blade 16 are located critically close to the interior casing which provides very little operating clearance. Hence, it is essential that any element protruding from the interior casing should not extend any distance within the interior thereof. The reasons for this are many but in particular there is the problem of cut grass and debris collecting and building up on the protruding element and of the blade coming in contact with the element either because of the build-up of material thereon or from the blade being knocked out of proper rotating position due to malfunctioning thereof or from hitting an external object on the ground.

Figure 2:
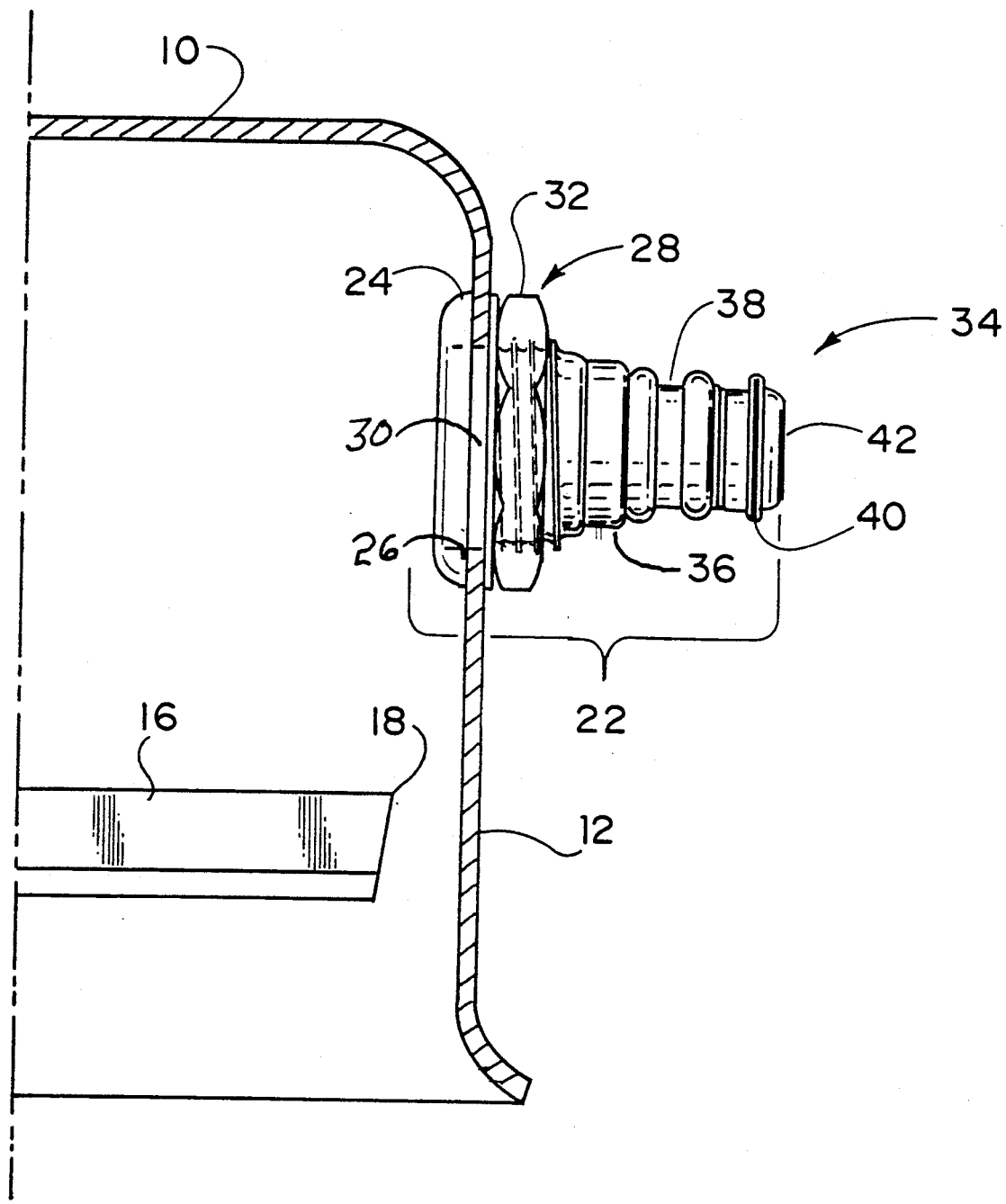
FIG. 2 is a perspective view of the attachment connected to the apron of a lawn mower.

The present invention has overcome these problems of the prior art attachments by presenting attachment 22 as shown in FIGS. 1 and 2. Attachment 22 is a molded plastic tubular member of predetermined length having an enlarged flat head formation 24 with smooth contour surfaces integral with the exxternally threaded tubular element 28 and its associated nut 32 and further inntegral with detent self sealing end fitting 34 which includes flattened fitted faces 36, locking groove 38 and O-ring seal 40. Detent, selfsealing end fitting 34 is made to fit the many standard garden hose quick connect fittings which are commercially available from many manufacturers but are not part of this invention.

The construction and operation of the combination of attachment 22 fitted to lawn mower 10 is best understood by reference to FIGS. 1 and 2. In appropriate hole 30 usually about one inch in diameter is drilled or otherwise cut in through the casing above the blade. Attachment 22 is then fitted through the hole from the interior side of the casing whereby enlarged, flat head formation 24 firmly engages the abutting casing interior surface at its overlapping edges 26. The exterior surface of tubular element 28 snuggly engages the cut out edge of the casing and is secured to the casing by tightening nut 32 as shown. Detent self-sealing end fitting 34 protrudes from the outside of the casing and is easily inserted and secured to commercially available quick disconnect fittings as discussed above.

As illustrated in FIG. 2, head formation 24 consists of an enlarged, flat, smooth contour surface which protrudes only about ⅜ of an inch within the casing and is tightly self-secured thereto. Therefor, there is no possibility of grass or debris cuttings adhereing thereto. Likewise, there is no possibility of the rotating blade striking the element. This is a significant improvement over prior art attachments.

Figure 3:
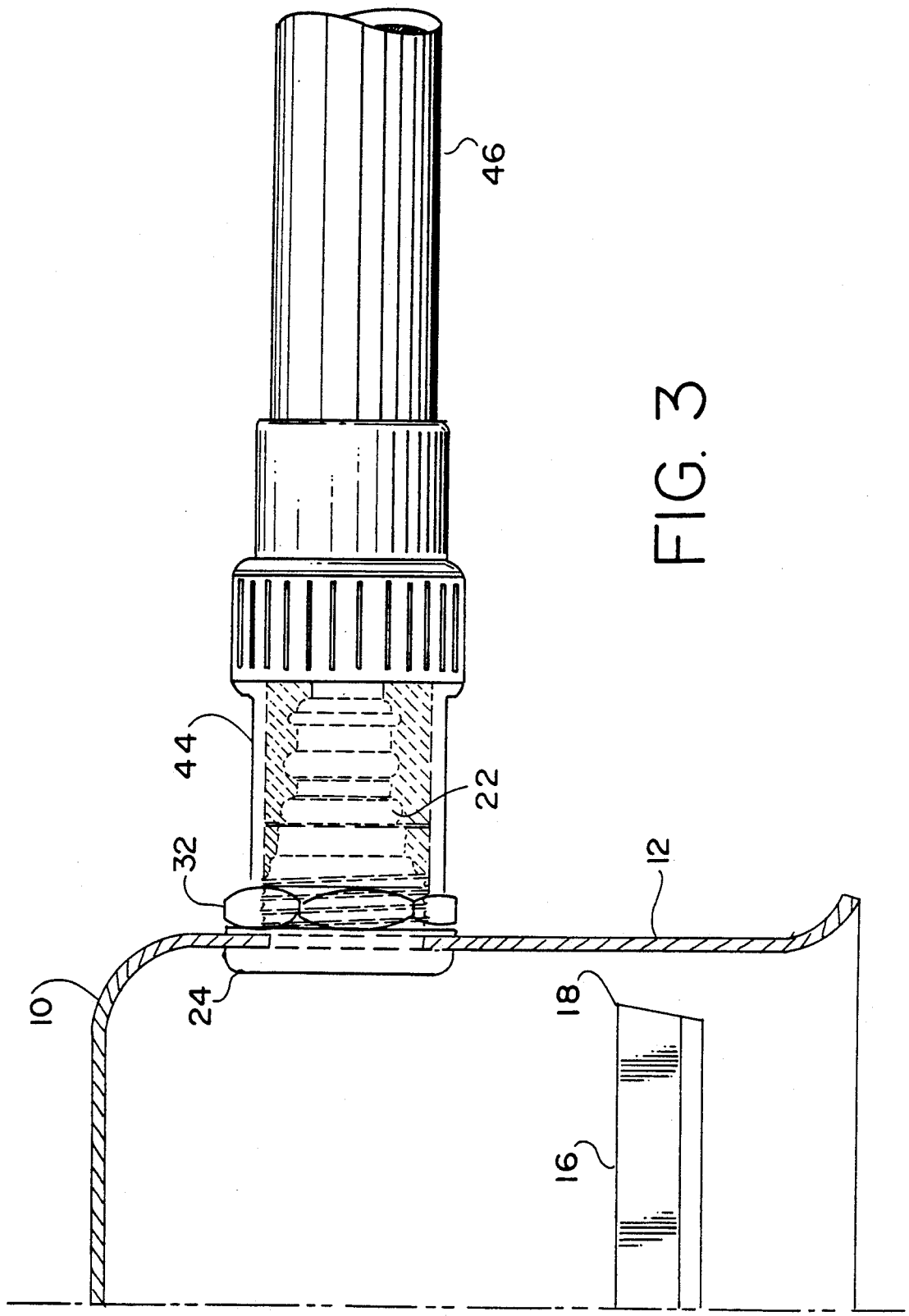
FIG. 3 is a perspective view of the attachment of FIG. 2 attached to a quick disconnect fitting attached to a water hose.

FIG. 3 is a sketch of the general type of quick disconnect water hose connectors 44 commercially available which is attached to attachment 22 and a water hose 46. Such disconnectors can quickly and easily be attached to the present attachment 22 of the invention. When attached to a hose or other water supply, the flow of water then passes through the connector through orifice 42 of receiver attachment 22 as illustrated in FIG. 3 and into the interior of the casing where it comes in contact with the rotating blade and is forced against the interior of the casing. The force of the water is so great that it thoroughly cleans the interior of the mower.

It was totally unexpected that the quick connector receiver of the invention would function so well with commercial hose disconnectors. It is believed that the unique construction of the connector receiver, its flush non-protruding abutment within the mower casing, its smooth contour surfaces, all combine to produce the unexpected results. Additional advantages include that the receiver is easily attacheable and removable from the mower but most importantly finally permits commercial disconnect hose attachments to be used in cleaning rotary lawn mowers. While particular embodiments of the invention have been illustrated and described, it will be apparent to those skilled in the art that various changes and modifications can be made without departing from the spirit and scope of the invention.

What is claimed is:

1. A rotary lawn mower in combination with an attachment for cleaning the underside of the lawn mower comprising said lawn mower having a side casing with an opening therein fitted with said attachment said attachment having a molded plastic hollow tubular means having a mower connecting means integral with a quick connect receiver means, the mower connecting means having a slightly raised mushroom shaped head flange formation with a smoothly contoured outer surface, said head flange formation integral with an externally threaded surface and securing nut means therefor, the quick connect receiver means having a self-sealing means sized to be inserted and secured within conventional hollow tubular quick disconnect fittings for conventional garden hoses, whereby said head flange formation adaptable for annular abutment to the interior wall of the side casing at the periphery of said opening and secured thereto by tightening the securing nut means on said threads on said hollow tubular means against the outer walls of the side casing, whereby said receiver means adaptable for connecting to and communicating with a hollow quick disconnect fitting attached to a water supply permiting the flow of water to be forced under pressure through the molded plastic hollow tubular means.

2. The lawn mower according to claim 1 whereby said self-sealing means comprises a detent fitting with an O-ring seal.

* * * * *